United States Patent
Kim et al.

(10) Patent No.: US 12,413,842 B2
(45) Date of Patent: Sep. 9, 2025

(54) ELECTRONIC DEVICE AND METHOD FOR CONTROLLING THE ELECTRONIC DEVICE

(71) Applicant: SAMSUNG ELECTRONICS CO., LTD., Suwon-si (KR)

(72) Inventors: Dongchan Kim, Suwon-si (KR); Jinyoung Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 221 days.

(21) Appl. No.: 18/136,148

(22) Filed: Apr. 18, 2023

(65) Prior Publication Data

US 2023/0283879 A1    Sep. 7, 2023

Related U.S. Application Data

(63) Continuation of application No. PCT/KR2021/014077, filed on Oct. 13, 2021.

(30) Foreign Application Priority Data

Oct. 21, 2020  (KR) .................. 10-2020-0136516

(51) Int. Cl.
*H04N 23/611*  (2023.01)
*H04N 23/60*   (2023.01)
(Continued)

(52) U.S. Cl.
CPC ......... *H04N 23/611* (2023.01); *H04N 23/632* (2023.01); *H04N 23/64* (2023.01); *H04N 23/815* (2023.01)

(58) Field of Classification Search
None
See application file for complete search history.

(56) References Cited

U.S. PATENT DOCUMENTS 8,345,921 B1 *  1/2013  Frome ............... G06V 20/56
                                                    382/105
8,508,622 B1    8/2013  Anon
                        (Continued)

FOREIGN PATENT DOCUMENTS

CN    305734719 S     4/2020
JP    2007-259035 A  10/2007
                    (Continued)

OTHER PUBLICATIONS

International Search Report (PCT/ISA/210) issued by the International Searching Authority on Jan. 24, 2022 in International Application No. PCTKR2021/014077.

(Continued)

*Primary Examiner* — James M Hannett
(74) *Attorney, Agent, or Firm* — Sughrue Mion, PLLC

(57) ABSTRACT

A method performed by an electronic device, includes: A method for performed by an electronic device, includes: acquiring an image by using a first lens; inputting information about a plurality of candidate regions of the image into a neural network model that is trained to acquire a score indicating whether a face of a person is included, and acquiring scores for the plurality of candidate regions; identifying a candidate region including at least part of a person's face among the plurality of candidate regions based on the acquired scores; and providing guide information for changing a capturing composition based on information about the location of the identified person region and a score of the identified person region.

15 Claims, 13 Drawing Sheets

(51) Int. Cl.
  *H04N 23/63* (2023.01)
  *H04N 23/80* (2023.01)

(56) References Cited

U.S. PATENT DOCUMENTS

| | | | |
|---|---|---|---|
| 9,264,620 | B2 | 2/2016 | Lee et al. |
| 9,282,239 | B2 | 3/2016 | Kim et al. |
| 9,392,163 | B2 | 7/2016 | Wu et al. |
| 9,491,370 | B2 | 11/2016 | Yeo et al. |
| 10,154,186 | B2 | 12/2018 | Kang et al. |
| 10,212,336 | B2 | 2/2019 | Kawahara et al. |
| 10,574,883 | B2 | 2/2020 | Purwar et al. |
| 10,616,478 | B2 | 4/2020 | Jung et al. |
| 10,951,813 | B2 | 3/2021 | Jung et al. |
| 10,979,625 | B2 | 4/2021 | Lee et al. |
| 11,017,215 | B2 * | 5/2021 | Yang .............. G06F 16/55 |
| 11,128,795 | B2 | 9/2021 | Youn et al. |
| 11,146,724 | B2 | 10/2021 | Jung et al. |
| 11,252,325 | B2 | 2/2022 | Sivan |
| 11,388,334 | B2 | 7/2022 | Li et al. |
| 11,671,701 | B2 | 6/2023 | Youn et al. |
| 11,678,050 | B2 | 6/2023 | Jung et al. |
| 2010/0110266 | A1 * | 5/2010 | Lee .............. H04N 23/611 348/333.02 |
| 2014/0192217 | A1 | 7/2014 | Kim et al. |
| 2014/0300779 | A1 | 10/2014 | Yeo et al. |
| 2016/0127641 | A1 * | 5/2016 | Gove .............. H04N 23/611 348/143 |
| 2018/0352150 | A1 | 12/2018 | Purwar et al. |
| 2019/0174056 | A1 | 6/2019 | Jung et al. |
| 2019/0208117 | A1 | 7/2019 | Jung et al. |
| 2019/0253614 | A1 * | 8/2019 | Oleson .............. H04N 23/62 |
| 2020/0092465 | A1 | 3/2020 | Lee et al. |
| 2020/0177802 | A1 | 6/2020 | Jung et al. |
| 2020/0267313 | A1 | 8/2020 | Youn et al. |
| 2021/0073564 | A1 * | 3/2021 | Piao .............. G06T 7/73 |
| 2021/0303968 | A1 | 9/2021 | Donsbach et al. |
| 2022/0006951 | A1 | 1/2022 | Youn et al. |
| 2022/0030163 | A1 | 1/2022 | Jung et al. |
| 2023/0283889 | A1 | 9/2023 | Jung et al. |
| 2023/0319396 | A1 | 10/2023 | Youn et al. |

FOREIGN PATENT DOCUMENTS

| | | |
|---|---|---|
| JP | 2011-97263 A | 5/2011 |
| JP | 5182507 B2 | 4/2013 |
| KR | 10-0648017 B1 | 11/2006 |
| KR | 10-2010-0048600 A | 5/2010 |
| KR | 10-1094648 B1 | 12/2011 |
| KR | 10-2014-0089132 A | 7/2014 |
| KR | 10-2014-0122344 A | 10/2014 |
| KR | 10-1513931 B1 | 4/2015 |
| KR | 10-1633342 B1 | 6/2016 |
| KR | 10-2019-0064958 A | 6/2019 |
| KR | 10-2019-0105533 A | 9/2019 |
| KR | 10-2020-0004841 A | 1/2020 |
| KR | 10-2020-0101230 A | 8/2020 |

OTHER PUBLICATIONS

Written Opinion (PCT/ISA/237) issued by the International Searching Authority on Jan. 24, 2022 in International Application No. PCT/KR2021/014077.
Office Action issued on May 29, 2024 by the Korean Patent Office for Korean Patent Application No. 10-2020-0136516.
Communication dated Feb. 24, 2025 issued by the Korean Intellectual Property Office in Korean Patent Application No. 10-2020-0136516.

* cited by examiner

ELECTRONIC DEVICE AND METHOD FOR CONTROLLING THE ELECTRONIC DEVICE

CROSS-REFERENCE TO RELATED APPLICATIONS

This application is a by-pass continuation application of International Application No. PCT/KR2021/014077, filed on Oct. 13, 2021, which is based on and claims priority to Korean Patent Application No. 10-2020-0136516, filed on Oct. 21, 2020, in the Korean Intellectual Property Office, the disclosures of which are incorporated by reference herein their entireties.

BACKGROUND

1. Field

The disclosure relates to an electronic device and a method for controlling the same, and more particularly, to an electronic device for changing a capturing composition for capturing a person's face without cropping the face, and a method for controlling the electronic device.

2. Description of Related Art

Recently, photographs are being captured through an electronic device such as a smartphone and a camera. In particular, an electronic device does not just perform a function of capturing a photograph, but recognizes a person's face when capturing a photograph, and thereby enhances the quality of the photograph or provides illumination/depth effects. Also, recent electronic devices can analyze a photograph and suggest an optimal capturing composition of the photography.

However, an electronic device does not suggest a composition specified for a person's face. For example, when the electronic device captures a person in a photograph, the face of the person located on an edge of the image is cropped in the photograph. Also, when capturing a selfie image by using a camera located on the rear surface, the user has to capture an image without checking a live view (a preview) of the image, thus some areas of the user's face are cropped in the image. Accordingly, there is a demand for a method for changing a capturing composition that prevents a user's face from being cropped in a captured image.

SUMMARY

Provided are an electronic device that provides guide information for changing a capturing composition based on a score related to a position of a user's face within the captured composition (e.g., acquired through an artificial intelligence model, such as a neural network model, which is trained to acquire a score indicating whether the entire face of a person has been captured), and a method for controlling the electronic device.

According to an aspect of the disclosure, a method performed by an electronic device, includes: acquiring an image by using a first lens: inputting information about a plurality of candidate regions of the image into a neural network model that is trained to acquire a score indicating whether a face of a person is included, and acquiring scores for the plurality of candidate regions: identifying a candidate region including at least part of a person's face among the plurality of candidate regions based on the acquired scores; and providing guide information for changing a capturing composition based on information about the location of the identified person region and a score of the identified person region.

The method may further include dividing an edge portion of the image into the plurality of candidate regions, and acquiring location information of the plurality of candidate regions, wherein the acquiring the scores comprises inputting information about the plurality of candidate regions of the image into the neural network model, and acquiring information on key points in the plurality of candidate regions together with scores for the plurality of candidate regions.

The method may further include acquiring information about a changing direction of the capturing composition based on information about the location of the identified person region, information on key points in the identified person region, and the score of the identified person region.

The guide information for changing the capturing composition may include providing the guide information comprising a message guiding a moving direction of the person in the person region for changing the capturing composition based on the acquired information about the changing direction of the capturing composition.

The providing the guide information for changing the capturing composition may include providing the guide information in a visual form through a display or providing in an auditory form through a speaker.

The method may further include providing a first user interface (UI) element indicating the center of the image while acquiring the image. The providing the guide information for changing the capturing composition may include providing the guide information comprising a second UI element for guiding movement of the first UI element to a location identified based on the acquired information about the changing direction of the capturing composition.

The method may further include displaying a user interface (UI) for setting a change of the first lens for changing a capturing composition.

The method may further includes, based on determining that the acquired score is within a threshold range while the setting of the change of the first lens is turned on for changing the capturing composition through the UI, capturing an image by using a second lens different from the first lens based on the information about the location of the identified person region and the score of the identified person region.

The second lens may be configured to acquire an image of a wider field of view than the first lens.

The method may further include: acquiring a reference score acquired by multiplying a number of pixels in face parts of a training image comprising the entire face by weights according to an importance of the face parts: acquiring a crop score acquired by multiplying a number of pixels in face parts in a crop image which randomly cropped the training image by weights according to the importance of the face parts: identifying a ratio of the reference score and the crop score as a face score corresponding to the crop image; and training the neural network model based on the crop image and the face score corresponding to the crop image.

According to another aspect of the disclosure, an electronic device includes: a camera including a first lens: a display: a memory; and a processor configured to: acquire an image by using the first lens, input information about a plurality of candidate regions of the image into a neural network model that is trained to acquire a score indicating whether a face of a person is included, and acquire scores for the plurality of candidate regions, identify a candidate region including at least part of a person's face among the plurality of candidate regions based on the acquired scores, and control the display to provide guide information for changing a capturing composition based on information about a location of the identified person region and a score of the identified person region.

The processor may be further configured to: divide an edge portion of the image into the plurality of candidate regions, acquire location information of the plurality of candidate regions, input information about the plurality of candidate regions of the image into the neural network model, and acquire information on key points in the plurality of candidate regions with scores for the plurality of candidate regions.

The processor may be further configured to acquire information about a changing direction of the capturing composition based on information about the location of the identified person region, information on key points in the identified person region, and the score of the identified person region.

The processor may be further configured to control the display to provide the guide information comprising a message guiding a moving direction of the person in the person region for changing the capturing composition, based on the acquired information about the changing direction of the capturing composition.

The electronic device may further include a speaker and the processor may be further configured to provide the guide information in an auditory form through the speaker.

According to one or more embodiments of the disclosure, a user can capture a person's photograph including the entire face of the person without cropping the person's face.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1A:
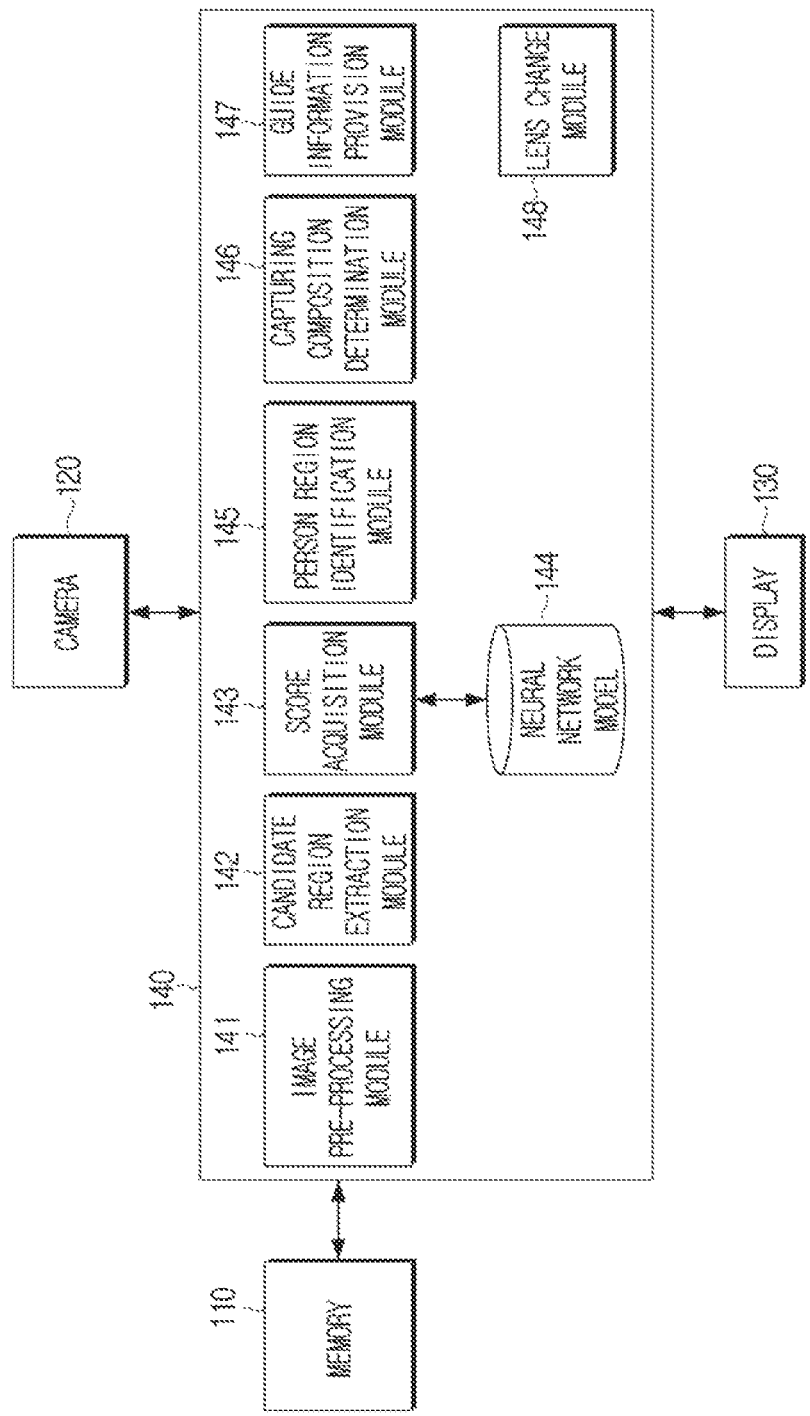
FIG. 1A is a block diagram illustrating a configuration of an electronic device according to an embodiment of the disclosure.

Various modifications may be made to the embodiments of the disclosure, and there may be various types of embodiments. Accordingly, specific embodiments will be illustrated in drawings, and the embodiments will be described in detail in the detailed description. However, it should be noted that the one or more embodiments are not for limiting the scope of the disclosure to a specific embodiment, but they should be interpreted to include various modifications, equivalents, and/or alternatives of the embodiments of the disclosure. Also, with respect to the detailed description of the drawings, similar components may be designated by similar reference numerals.

Also, in describing the disclosure, in case it is determined that detailed explanation of related known functions or features may unnecessarily confuse the gist of the disclosure, the detailed explanation will be omitted.

In addition, the embodiments described below may be modified in various different forms, and the scope of the technical idea of the disclosure is not limited to the embodiments below. Rather, these embodiments are provided to make the disclosure more sufficient and complete, and to fully convey the technical idea of the disclosure to those skilled in the art.

Also, the terms used in the disclosure are used only to explain specific embodiments, and are not intended to limit the scope of the disclosure. Further, singular expressions include plural expressions, unless defined obviously differently in the context.

In addition, in the disclosure, expressions such as "have," "may have," "include," and "may include" denote the existence of such characteristics (e.g., elements such as numbers, functions, operations, and components), and do not exclude the existence of additional characteristics.

Also, in the disclosure, the expressions "A or B," "at least one of A and/or B," or "one or more of A and/or B" and the like may include all possible combinations of the listed items. For example, "A or B," "at least one of A and B," or "at least one of A or B" may refer to all of the following cases: (1) including A, (2) including B, or (3) including both A and B.

In addition, the expressions "first," "second," and the like used in the disclosure may describe various elements regardless of any order and/or degree of importance. Also, such expressions are used only to distinguish one element from another element, and are not intended to limit the elements.

The description in the disclosure that one element (e.g., a first element) is "(operatively or communicatively) coupled with/to" or "connected to" another element (e.g., a second element) should be interpreted to include both the case where the one element is directly coupled to the another element, and the case where the one element is coupled to the another element through still another element (e.g., a third element).

In contrast, the description that one element (e.g., a first element) is "directly coupled" or "directly connected" to another element (e.g., a second element) can be interpreted to mean that still another element (e.g., a third element) does not exist between the one element and the another element.

Also, the expression "configured to" used in the disclosure may be interchangeably used with other expressions such as "suitable for," "having the capacity to," "designed to," "adapted to," "made to," and "capable of," depending on cases. The term "configured to" does not necessarily mean that a device is "specifically designed to" in terms of hardware.

Instead, under some circumstances, the expression "a device configured to" may mean that the device "is capable of" performing an operation together with another device or component. For example, the phrase "a processor configured to perform A, B, and C" may mean a dedicated processor (e.g., an embedded processor) for performing the corresponding operations, or a generic-purpose processor (e.g., a CPU or an application processor) that can perform the corresponding operations by executing one or more software programs stored in a memory device.

Further, in the embodiments of the disclosure, 'a module' or 'a unit' may perform at least one function or operation, and may be implemented as hardware or software, or as a combination of hardware and software. Also, a plurality of 'modules' or 'units' may be integrated into at least one module and implemented as at least one processor, excluding 'a module' or 'a unit' that needs to be implemented as specific hardware.

Various elements and areas in the drawings were illustrated schematically. Accordingly, the technical idea of the disclosure is not limited by the relative sizes or intervals illustrated in the accompanying drawings.

An electronic device according to the one or more embodiments of the disclosure may include, for example, at least one of a smartphone, a tablet PC, a desktop PC, a laptop PC, or a wearable device. A wearable device may include at least one of an accessory-type device (e.g., a watch, a ring, a bracelet, an ankle bracelet, a necklace, glasses, a contact lens, or a head-mounted-device (HMD)), a device integrated with fabrics or clothing (e.g., electronic clothing), a body-attached device (e.g., a skin pad or a tattoo), or an implantable circuit.

Also, in some embodiments, an electronic device may include, for example, at least one of a television, a digital video disk (DVD) player, an audio, a refrigerator, an air conditioner, a cleaner, an oven, a microwave oven, a washing machine, an air purifier, a set top box, a home automation control panel, a security control panel, a media box (e.g., Samsung HomeSync™, Apple TV™, or Google TV™), a game console (e.g., Xbox™, PlayStation™), an electronic dictionary, an electronic key, a camcorder, or an electronic photo frame.

In addition, in other embodiments, an electronic device may include at least one of various types of medical instruments (e.g., various types of portable medical measurement instruments (a blood glucose meter, a heart rate meter, a blood pressure meter, or a thermometer, etc.), magnetic resonance angiography (MRA), magnetic resonance imaging (MRI), computed tomography (CT), a photographing device, or an ultrasonic instrument, etc.), a navigation device, a global navigation satellite system (GNSS), an event data recorder (EDR), a flight data recorder (FDR), a vehicle infotainment device, an electronic device for vessels (e.g., a navigation device for vessels, a gyrocompass, etc.), avionics, a security device, a head unit for a vehicle, an industrial or a household robot, a drone, an ATM of a financial institution, a point of sales (POS) of a store, or an Internet of things (IoT) device (e.g., a light bulb, various types of sensors, a sprinkler device, a fire alarm, a thermostat, a street light, a toaster, exercise equipment, a hot water tank, a heater, a boiler, etc.).

Hereinafter, embodiments according to the disclosure will be described in detail with reference to the accompanying drawings to the extent that those having ordinary skill in the art to which the disclosure belongs can easily carry out the embodiments.

Hereinafter, the disclosure will be described in more detail with reference to the drawings. FIG. 1 is a block diagram illustrating a configuration of an electronic device according to an embodiment of the disclosure. The electronic device 100 includes a memory 110, a camera 120, a display 130, and a processor 140. Here, the electronic device 100 may also be implemented as a smartphone. However, the electronic device 100 according to the disclosure is not limited to a device of a specific type, but it may be implemented as various types of electronic devices 100 such a tablet PC and a digital camera, etc.

The memory 110 may store data necessary for a module for changing a capturing composition for preventing a person's face from being cropped to perform various types of operations. A module for changing a capturing composition may include an image pre-processing module 141, a candidate region extraction module 142, a score acquisition module 143, a candidate region identification module 145, a capturing composition determination module 146, a guide information provision module 147, and a lens change module 148. Also, the memory 110 may store a neural network model 144 trained to acquire a score (e.g., a first score) indicating whether the entire face of a person has been captured.

The memory 110 may include a non-volatile memory that can maintain stored information even based on power supply being stopped, and a volatile memory that needs constant power supply for maintaining stored information. Data for the module for changing a capturing composition to perform various types of operations may be stored in the non-volatile memory. Also, the neural network model 144 for acquiring a score (e.g., a first score) indicating whether the entire face of a person has been captured may also be stored in the non-volatile memory.

In addition, the memory 110 may include at least one buffer that temporarily stores a plurality of image frames acquired through each of a plurality of lenses included in the camera 120.

Figure 1B:
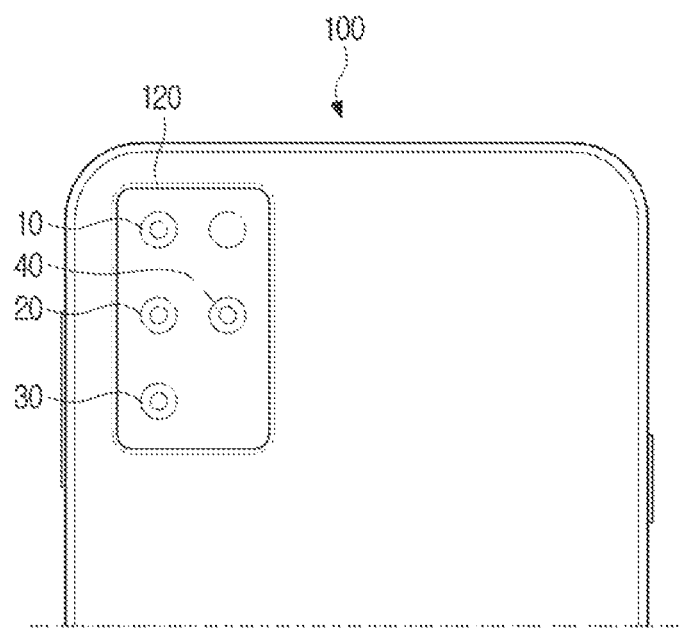
FIG. 1B is a diagram for schematically illustrating a camera of an electronic device according to an embodiment of the disclosure.

The camera 120 may include a plurality of lenses different from one another. Here, the feature that the plurality of lenses are different from one another may include a case wherein the field of views (FOVs) of each of the plurality of lenses are different from one another and a case wherein the locations wherein each of the plurality of lenses is arranged are different, etc. For example, as illustrated in FIG. 1B, the camera 120 of the electronic device 100 may include a telephoto lens 10, a wide angle lens 20, and a super wide angle lens 30 arranged on the rear surface of the electronic device 100, and it may also include a three dimensional depth (3D) lens 40. Also, the camera 120 may include a telephoto lens arranged on the front surface of the electronic device 100 together with the telephoto lens 10, the wide angle lens 20, and the super wide angle lens 30, etc. arranged on the rear surface of the electronic device 100. That is, there is no special limitation on the number and the types of the lenses according to the disclosure. Here, the telephoto lens 10 has a wider field of view than a super telephoto lens, and a standard lens has a wider field of view than the telephoto lens 10, and the wide angle lens 20 has a wider field of view than the standard lens, and the super wide angle lens 30 has a wider field of view than the wide angle lens 20. For example, the field of view of the super telephoto lens may be 3 to 6 degrees, the field of view of the telephoto lens 10 may be eight to 28 degrees, the field of view of the standard lens may be 47 degrees, the field of view of the wide angle lens 20 may be 63 to 84 degrees, and the field of view of the super wide angle lens 30 may be 94 to 114 degrees.

Also, while an image frame acquired through a lens may include a scene in a relatively wider range as the field of view of the lens is wider, the size of an object included in the image frame may become relatively smaller, and exaggeration of perspective may be generated. While an image frame acquired through a lens may include an object in an enlarged size as the field of view of the lens is narrower, the image frame may include only a scene in a relatively narrower range.

Hereinafter, explanation will be described focused on a case wherein the camera 120 of the electronic device 100 includes two lenses which are a first lens (e.g., a wide angle lens) and a second lens (e.g., a super wide angle lens), within a necessary range for the convenience of explanation.

The display 130 may display a live view of an image captured through the camera 120. Also, the display 130 may display guide information for changing the capturing composition of the camera 120. In addition, the display 130 may display a UI for setting a change of a lens for changing the capturing composition.

The display 130 may be implemented as a liquid crystal display (LCD) panel, organic light emitting diodes (OLED), etc., and also, the display 130 may be implemented as a flexible display, a transparent display, etc. depending on cases. However, the display 130 according to the disclosure is not limited to specific types.

The processor 140 may be electronically connected with the memory 110, and control the overall functions and operations of the electronic device 100.

Based on a camera application being executed or a user instruction for changing the capturing composition is input, the processor 140 may load data for the module for changing a capturing composition stored in the non-volatile memory to perform various types of operations on the volatile memory. Then, the processor 140 may load the neural network model for acquiring a score on the volatile memory. The processor 140 may perform various types of operations through various kinds of modules and the neural network model based on the data loaded on the volatile memory. Here, loading means an operation of calling in data stored in the non-volatile memory to the volatile memory and storing the data, so that the processor 140 can access the data.

In particular, based on the camera application being executed by a first user instruction, the processor 140 may acquire an image through the camera 120. For example, the processor 140 may acquire a live view image through the first lens (e.g., the wide angle lens 20) included in the camera 120. Here, 'a live view image' means an image displayed on the display 130 of the electronic device 100 as light that comes in through the lens of the camera is converted into an electronic image signal through an image sensor of the camera. Here, the image acquired through the first lens may be stored in the buffer.

Also, the processor 140 may perform pre-processing for the image acquired through the first lens through the image pre-processing module 141. In particular, the image pre-processing module 141 may include an image resize processing module that resizes an image and a normalization module that normalizes the brightness and the contrast of an image. By this, the processor 140 may adjust the size of the image acquired through the first lens, and correct the brightness and the contrast.

Figure 2:
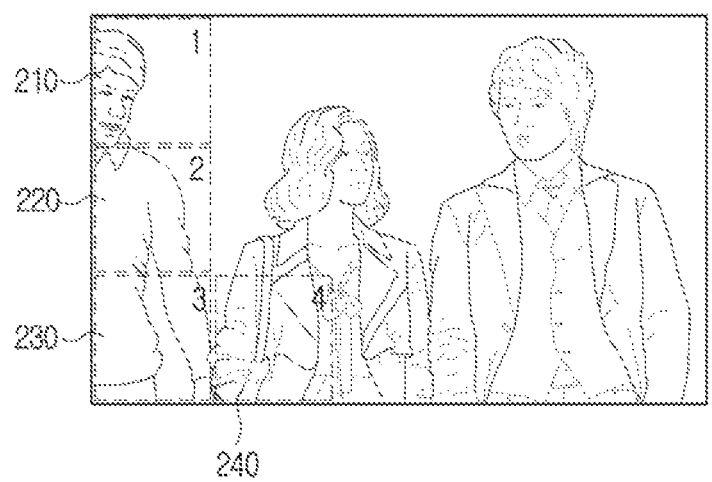
FIG. 2 is a diagram for illustrating a method for an electronic device to acquire a plurality of candidate regions according to an embodiment of the disclosure.

In addition, the processor 140 may extract a plurality of candidate regions from an edge portion of the image acquired through the first lens through the candidate region extraction module 142. Specifically, as illustrated in FIG. 2, the processor 140 may divide an edge portion of the image acquired through the first lens into a plurality of candidate regions (the first candidate region 210, the second candidate region 220, the third candidate region 230, the fourth candidate region 240), . . . , and extract the plurality of candidate regions. Here, the sizes of the plurality of candidate regions (the first candidate region 210, the second candidate region 220, the third candidate region 230, the fourth candidate region 240), . . . may be adjusted according to the size of a person's face located on the edge. Also, in FIG. 2, it is illustrated that the plurality of candidate regions (the first candidate region 210, the second candidate region 220, the third candidate region 230, the fourth candidate region 240), . . . do not overlap with one another, but this is merely an example, and the plurality of candidate regions (the first candidate region 210, the second candidate region 220, the third candidate region 230, the fourth candidate region 240), . . . may be extracted to overlap with one another. In addition, the candidate region extraction module 142 may acquire location information (e.g., pixel location information) for the plurality of candidate regions (the first candidate region 210, the second candidate region 220, the third candidate region 230, the fourth candidate region 240), . . . .

Further, the processor 140 may input information about the plurality of candidate regions (the first candidate region 210, the second candidate region 220, the third candidate region 230, the fourth candidate region 240), . . . through the score acquisition module 143, and acquire scores for the plurality of candidate regions (e.g., a set of second scores for the plurality of candidate regions). Specifically, the score acquisition module 143 may input information about the plurality of candidate regions (the first candidate region 210, the second candidate region 220, the third candidate region 230, the fourth candidate region 240), . . . into the neural network model 144 trained to acquire a score (e.g., a first score) indicating whether the entire face of a person has been captured, and acquire scores for the plurality of candidate regions (e.g., a set of second scores for the plurality of candidate regions).

Figure 3:
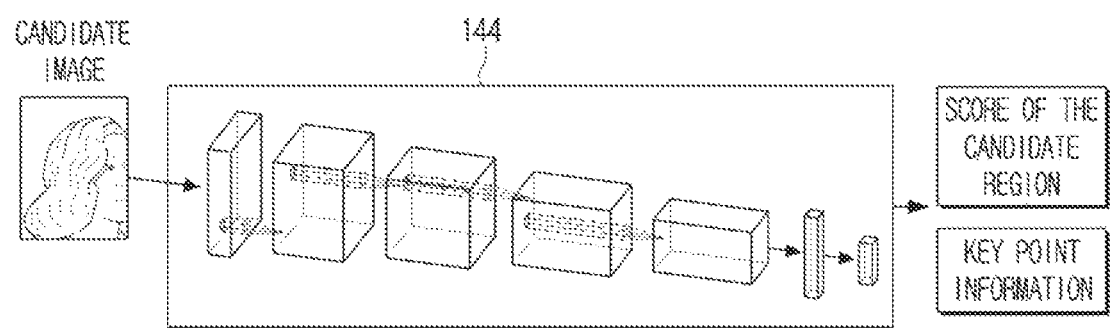
FIG. 3 is a diagram for illustrating a neural network model for acquiring scores of candidate regions according to an embodiment of the disclosure.

Here, the neural network model 144 may be implemented as a convolutional neural network (CNN) model as illustrated in FIG. 3, but this is merely an example, and it may be implemented as at least one artificial neural network model among a deep neural network (DNN) model, a recurrent neural network (RNN) model, or a generative adversarial networks (GAN) model. Moreover, the neural network model 144 is just an example of artificial intelligence models that can be used in the disclosure. The disclosure is not limited to the neural network model and other artificial intelligence models (such as a gradient boosted decision tree, XGBoost, or other machine learning models known in the art) can be used for embodiments or implementations of the disclosure.

In particular, as illustrated in FIG. 3, based on information about the candidate regions being input into the neural network model 144, the neural network model 144 may not only acquire score information of the candidate regions, but also acquire key point information. Here, the key point information may be location information about key points (the eyes, the nose, the mouth, the ears, etc.) included in the face.

Figure 4:
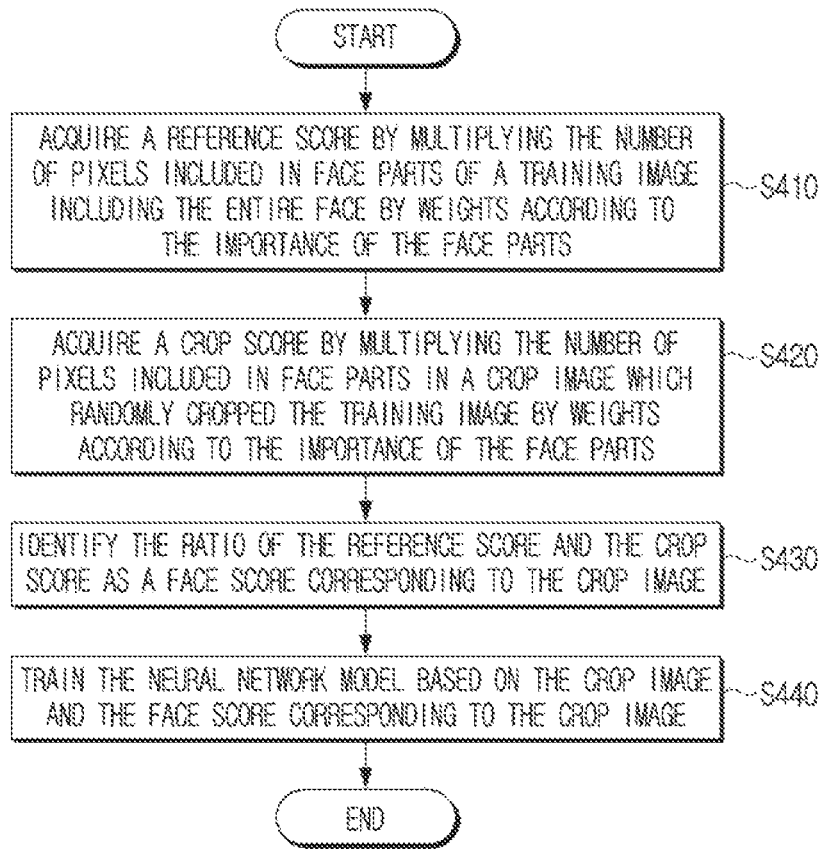
FIG. 4 is a flow chart for illustrating a method for training a neural network model according to an embodiment of the disclosure.

FIG. 4 is a flow chart for illustrating a method for training the neural network model 144 according to an embodiment of the disclosure.

Figure 5:
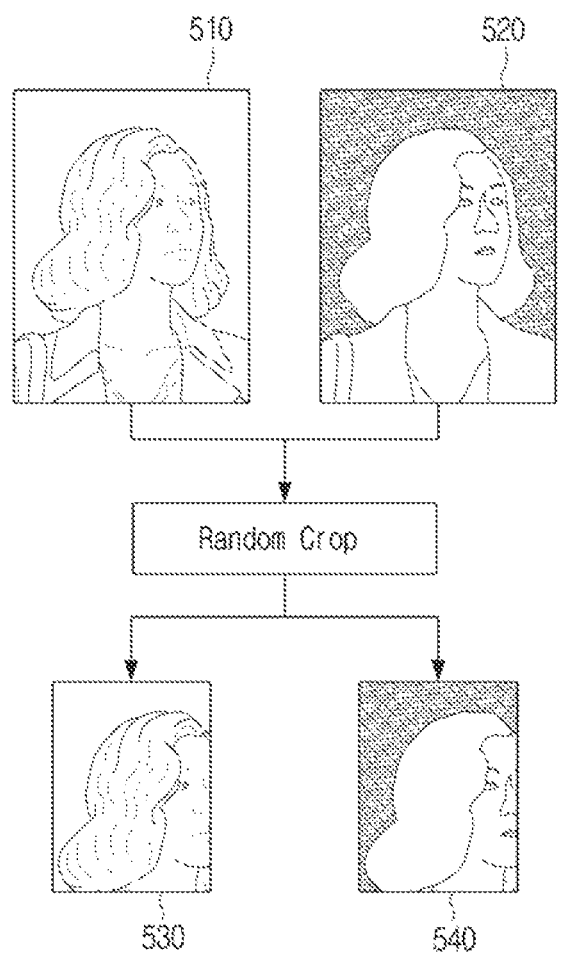
FIG. 5 is a diagram for illustrating a method for acquiring a segmentation image by randomly cropping a training image according to an embodiment of the disclosure.

First, the electronic device 100 may acquire a reference score which is acquired by multiplying the number of pixels included in face parts of a training image including the entire face by weights according to the importance of the face parts in operation S410. Specifically, the electronic device 100 may acquire an image 510 including a user's entire face, as illustrated in FIG. 5. Then, the electronic device 100 may convert the acquired image 510 into a segmentation image 520, and acquire a training image. Here, the segmentation image 520 is an image that divided the person's face included in the image based on the face parts (e.g., the skin, the eyes, the nose, the lips, etc.). Here, labeling may have been performed for the face parts. The segmentation image 520 ($I_{seg}$) may be implemented as a sum of the face parts, as in Formula 1 below.

$$I_{seg} = I_{skin} \cup I_{eye} \cup I_{nose} \cup I_{lips} \quad \text{[Formula 1]}$$

Then, the electronic device 100 may acquire a reference score which is acquired by multiplying the number of pixels of the face parts included in the segmentation image 520 by weights according to the importance of the face parts, as in Formula 2 below.

$$\text{Score}_{reference} = \sum_{k \in skin, eye, nose, lips, \ldots} \gamma_k N_k \quad \text{[Formula 2]}$$

Here, N may be the number of the pixels included in each face part in the segmentation image 520 (number of pixels in the segmentation image of each face part), and Y may be the weight of each part of the face (weight of each face part). Here, the weights may be, for example, 5 for the eyes, 4 for the nose, 3 for the mouth, 2 for the ears, 1 for the skin, and 0 for the hair, but this is merely an example, and the weights may be set as different values.

Then, the electronic device 100 may acquire a crop score acquired by multiplying a number of pixels included in face parts of a crop image, (which randomly crops the training image) by weights according to the importance of the face parts in operation S420. Specifically, the electronic device 100 may acquire an image 530 including a part of the person's face by randomly cropping the acquired image 510, as illustrated in FIG. 5. Through this, the image 530 including only a part of the face may be deemed as a photograph that generated the image cropped by the capturing field of view of the camera by simulation. Then, in a likewise manner, the electronic device 100 may crop the segmentation image 520, and acquire a crop image that is a segmentation image 540 including a part of the face.

Then, the electronic device 100 may acquire a crop score by multiplying the number of the pixels of the face parts included in the segmentation image 540 by the weights according to the importance of the face parts, as in Formula 3 below.

$$\text{Score}_{crop} = \sum_{k \in skin, eye, nose, lips, \ldots} \gamma_k N_k \quad \text{[Formula 3]}$$

The electronic device 100 may identify the ratio of the reference score and the crop score as a face score corresponding to the crop image in operation S430. That is, the electronic device 100 may identify a face score corresponding to the crop image through Formula 4 below.

$$\text{Score}_{face} = \frac{\text{Score}_{crop}}{\text{Score}_{reference}} \quad \text{[Formula 4]}$$

The electronic device 100 may train the neural network model 144 based on the crop image and the face score corresponding to the crop image in operation S440. Specifically, the electronic device 100 may use the crop image (here, the crop image is the image 530 including only a part of the face but not the segmentation image 540) and the face score corresponding to the crop image as a data set. That is, the electronic device 100 may train the neural network model 144 by using input data as the crop image, and using output data as the face score. Here, the electronic device 100 may train the neural network model 144 by using not only the face score but also information on key points (i.e., the main parts of the face) as output data.

In the aforementioned embodiment, the electronic device 100 trains the neural network model 144, but this is merely an example, and another device (e.g., a server) may train the neural network model 144.

Referring to FIG. 1 again, the processor 140 may acquire scores for each of the plurality of candidate regions (the first candidate region 210, the second candidate region 220, the third candidate region 230, the fourth candidate region 240), . . . through the neural network model 144 as described above. For example, the processor 140 may acquire a score for the first candidate region 210 as 0.8, a score for the second candidate region 220 as 0.01, a score for the third candidate region 230 as 0.02, and a score for the fourth candidate region 240 as 0.01. Also, the processor 140 may acquire information on key points of the face included in the plurality of candidate regions (the first candidate region 210, the second candidate region 220, the third candidate region 230, the fourth candidate region 240), . . . through the neural network model 144.

The processor 140 may identify a person region including the person's face among the plurality of candidate regions (the first candidate region 210, the second candidate region 220, the third candidate region 230, the fourth candidate region 240), . . . through the person region identification module 145. Specifically, the person region identification module 145 may identify a region of which score exceeds a threshold value among the plurality of candidate regions (the first candidate region 210, the second candidate region 220, the third candidate region 230, the fourth candidate region 240), . . . as the person region. For example, the person region identification module 145 may identify the first candidate region 210 of which score is greater than the threshold value 0.6 as the person region. The person region identification module 145 may identify the candidate regions (the second candidate region 220, the third candidate region 230, the fourth candidate region 240), . . . of which scores are lower than the threshold value as general areas which are not a person region.

The processor 140 may determine a capturing composition based on location information of the identified person region 210, information on the key points included in the identified person region, and the score of the identified person region through the capturing composition determination module 146. In particular, the capturing composition determination module 146 may acquire information about a changing direction of the capturing composition based on location information of the identified person region 210, information on key points included in the identified person region, and the score of the identified person region. For example, based on the location of the person region 210 being the upper edge region on the left side, the face score included in the person region 210 is 0.8, and parts of the locations of the key points (the eyes, the nose, the mouth, the eyebrows) included in the person region 210 and the left eye among the key points are cropped, the capturing composition determination module 146 may determine the changing direction of the capturing composition as the northwestern direction. Also, the capturing composition determination module 146 may determine information about a changing distance of the capturing composition based on the information on the key points included in the identified person region and the score of the identified person region. Specifically, the capturing composition determination module 146 may identify the size of the cropped face regions based on the information on the key points included in the identified person region and the score of the identified person region, and determine information about a changing distance of the capturing composition for all of the cropped face regions to be seen.

According to another embodiment, the capturing composition determination module 146 may determine information about a moving direction of the person included in the person region for changing the capturing composition based on the location information of the identified person region 210, the information on the key points included in the identified person region, and the score of the identified person region. Specifically, based on the location of the person region 210 being the upper edge region on the left side, the face score included in the person region 210 is 0.8, and parts of the locations of the key points (the eyes, the nose, the mouth, the eyebrows) included in the person region 210 and the left eye among the key points are cropped, the capturing composition determination module 146 may determine the moving direction of the person included in the person region 210 as the eastern direction for changing the capturing composition.

According to still another embodiment, in case the face of another person included in the image is cropped due to the changing distance, the capturing composition determination module 146 may determine information for widening the capturing field of view for changing the capturing composition.

The processor 140 may acquire guide information for changing the capturing composition through the guide information provision module 147. Specifically, the guide information provision module 147 may generate guide information based on at least one of information about a changing direction of the capturing composition or information about a changing distance of the capturing composition determined by the capturing composition determination module 146, and may provide the information.

Figure 6A:
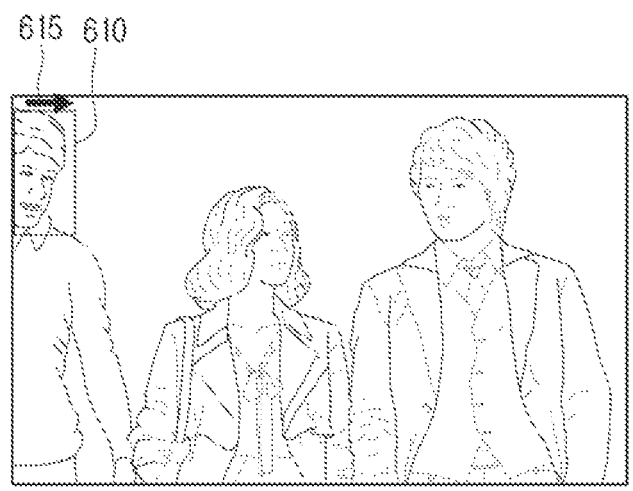
FIG. 6A and FIG. 6B are diagrams for illustrating guide information provided through a display according to an embodiment of the disclosure.

Here, the processor 140 may provide guide information in a visual form through the display 130. As an example, the processor 140 may control the display 130 to display an indicator 615 guiding movement to the right side in a person region included in a live view together with a bounding box (the first UI element 610) as illustrated in FIG. 6A, based on information about a moving direction of the person determined by the capturing composition determination module 146. Here, the processor 140 may provide a vibration feedback by using an actuator together with the bounding box (the first UI element 610) and the indicator 615 as guide information.

As another example, the processor 140 may provide a UI guiding a change of the capturing composition based on information about a changing direction of the capturing composition and information about a changing distance of the capturing composition determined by the capturing composition determination module 146. Specifically, while acquiring an image through the first lens, the processor 140 may control the display 130 to display a first UI element 610 indicating the center of the image on a live view. Then, as illustrated on the left side of FIG. 6B, the processor 140 may control the display 130 to provide guide information including a second UI element 620 for guiding movement of the first UI element 610 to a location identified based on at least one of the acquired information about the changing direction of the capturing composition or information about the changing distance of the capturing composition. Here, in case the first UI element 610 and the second UI element 620 coincide as the user moved the electronic device 100, as illustrated on the right side of FIG. 6B, the processor 140 may provide a feedback message guiding completion of the change of the capturing composition. The feedback message may be provided in at least one form among a visual form (e.g., a guide message), an auditory form (e.g., a voice message), and a tactile form (e.g., a vibration message).

Also, the processor 140 may provide guide information in an auditory form through the speaker. Specifically, the processor 140 may provide a voice message 640 which is "Gentleman on the left, please move to the center" as illustrated in FIG. 6C, based on information about the moving direction of the person determined by the capturing composition determination module 146. Here, the processor 140 may provide a vibration feedback together by using the actuator, along with the voice message 640 as guide information.

Figure 6B:
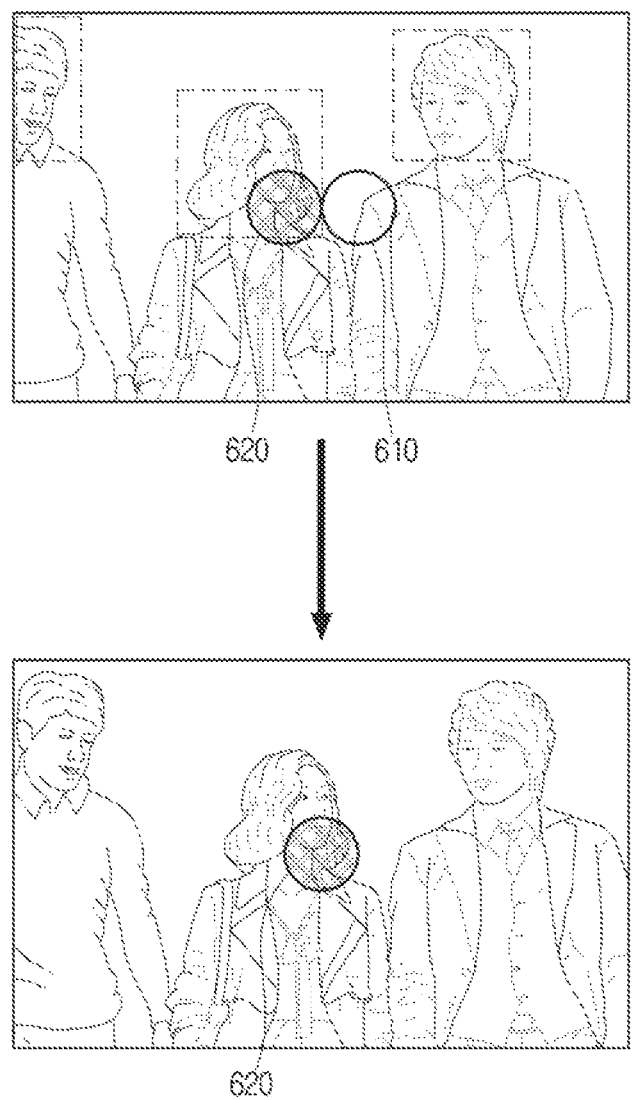
Figure 6C:
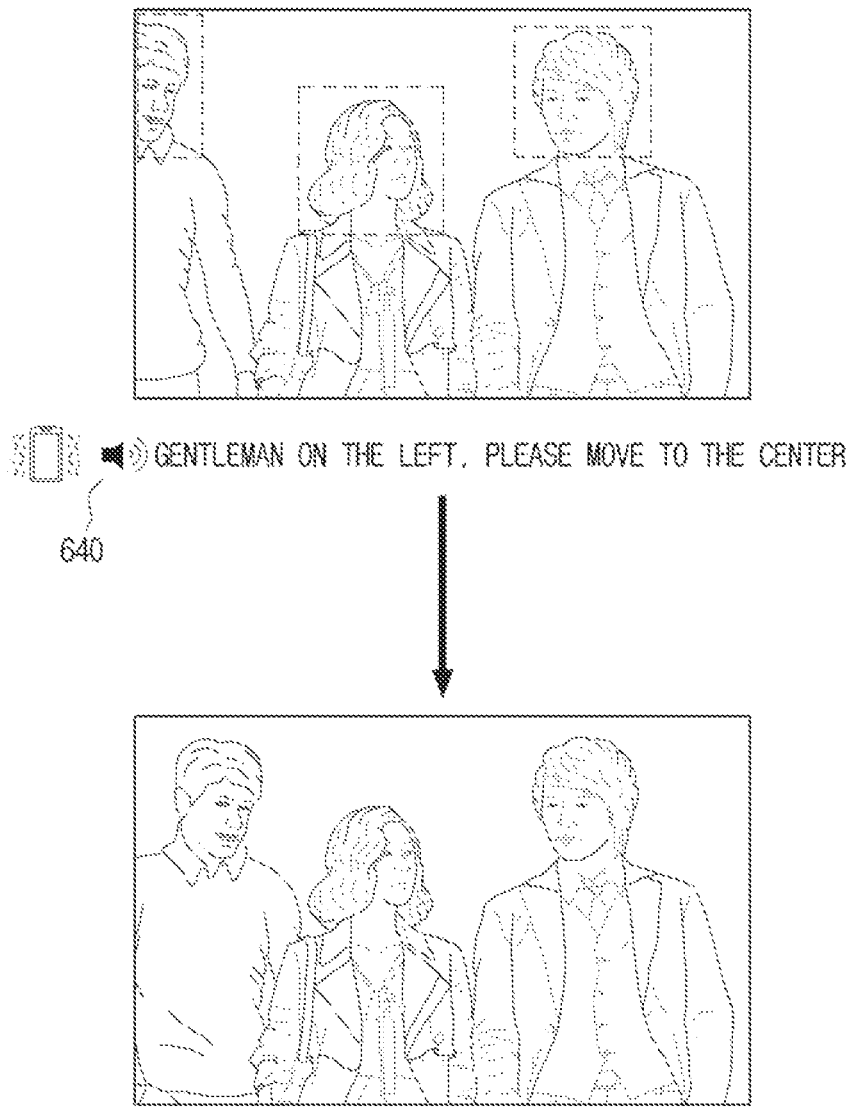
FIG. 6C is a diagram for illustrating guide information provided through a speaker or an actuator according to an embodiment of the disclosure.

In FIG. 6A to FIG. 6C, guide information is provided through the display 130 or the speaker, but this is merely an example, and guide information in different forms may be provided. For example, guide information may be provided by flickering LED included in the electronic device 100, or guide information in a vibration form may be provided through the actuator.

In the aforementioned embodiment, guide information is provided based on information about a changing direction of a capturing composition for changing the capturing composition or information about movement of a person. However, this is merely an example, and the electronic device 100 may change a capturing composition by widening a field of view by changing the lens included in the camera 120 according to user setting.

Figure 7:
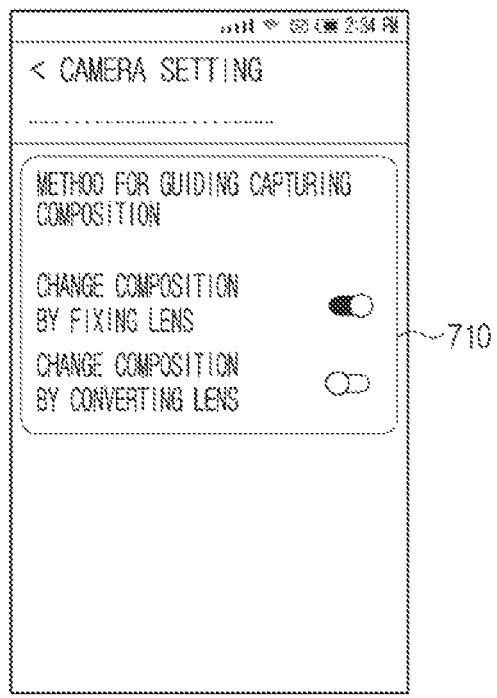
FIG. 7 is a diagram illustrating a UI setting a change of a lens for changing a capturing composition according to an embodiment of the disclosure.

Specifically, the processor 140 may control the display 130 to display a UI 710 for automatically setting a change of the lens for changing the capturing composition as illustrated in FIG. 7. The user may select at least one of a method for changing the composition by fixing the lens or a method for changing the composition by converting the lens through the UI 710. Based on the method for changing the composition by fixing the lens being selected, the processor 140 may provide guide information by the method as illustrated in FIG. 6A to FIG. 6C.

Figure 8:
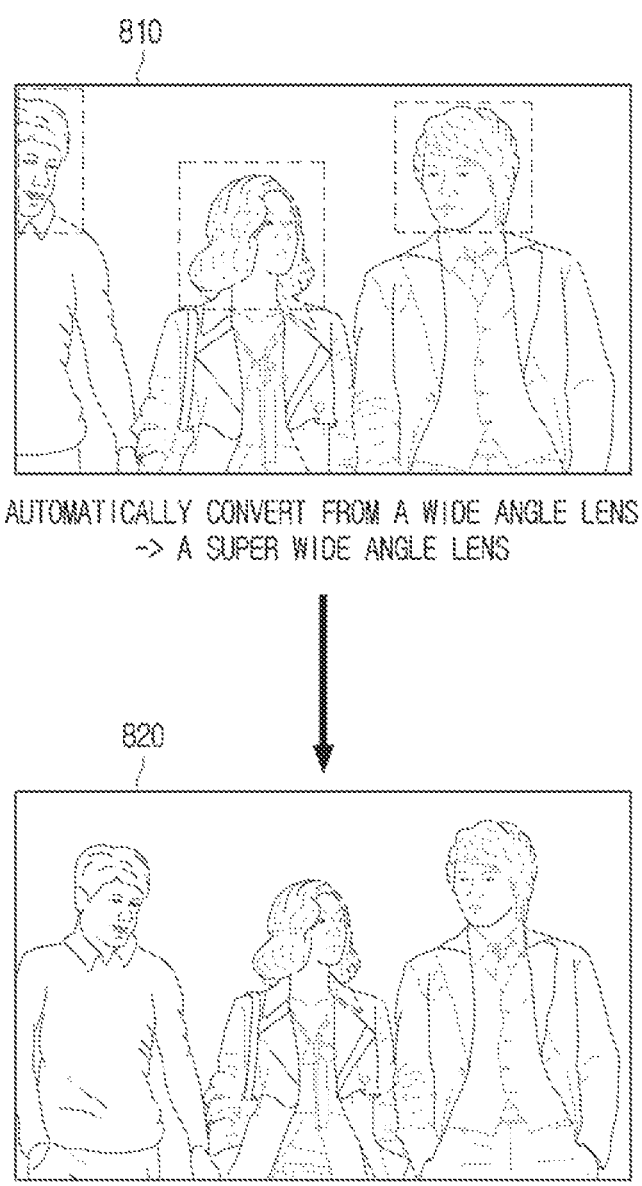
FIG. 8 is a diagram for illustrating a method for changing a capturing composition by changing a lens according to an embodiment of the disclosure.

Based on the method for changing the composition by converting the lens being selected, the processor 140 may change the lens to a lens that can capture a wider field of view for changing the capturing composition. That is, the processor 140 may capture an image by changing the first lens to the second lens having a wider field of view than the first lens through the lens change module 148. Specifically, the lens change module 148 may capture an image by changing the lens from the first lens to the second lens based on information for widening the capturing field of view for changing the capturing composition determined by the capturing composition determination module 146. For example, the processor 140 may capture an image by automatically changing from the wide angle lens 20 to the super wide angle lens 30 as illustrated in FIG. 8, based on information for widening the capturing field of view for changing the capturing composition. By this, even though a part of the person located on the left side is cropped in the image 810 illustrated on the left side of FIG. 8, in the image 820 illustrated on the right side of FIG. 8, the image may be captured while the faces of all the people included in the image are included through the change of the lens.

In the aforementioned embodiment, a field of view is widened by changing the lens, but this is merely an example, and the technical idea of the disclosure can also be applied to a method for widening a field of view through a zooming operation without changing the lens.

As described above, in case a part of the face of a person is cropped, the electronic device 100 may provide guide information for changing the capturing composition or change the capturing composition by changing the lens. By this, the electronic device 100 can capture an image including the entire face, and can thus provide a more improved image capturing function.

Figure 9:
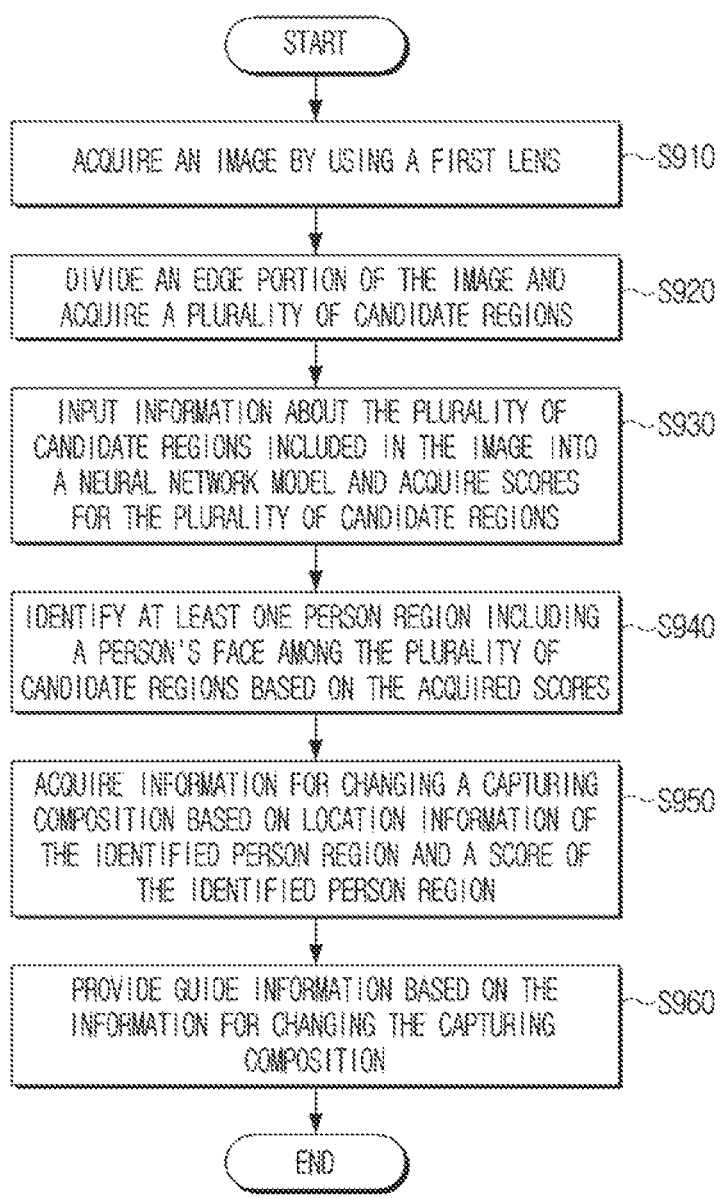
FIG. 9 is a flow chart for illustrating a method for controlling an electronic device according to an embodiment of the disclosure.

FIG. 9 is a flow chart for illustrating a method for controlling an electronic device according to an embodiment of the disclosure.

First, the electronic device 100 may acquire an image by using the first lens in operation S910. Here, the first lens may be a wide angle lens, and the image acquired by the first lens may be provided as a live view.

The electronic device 100 may divide the edge portion of the image, and acquire a plurality of candidate regions in operation S920. Here, the sizes of the plurality of candidate regions may be determined according to the size of a person's face. Also, based on the electronic device 100 acquiring the plurality of candidate regions, the electronic device 100 may acquire location information for the plurality of candidate regions together.

The electronic device 100 may input (or provide) the information about the plurality of candidate regions of the image into the neural network model, and acquire scores for the plurality of candidate regions (e.g., a set of scores for the plurality of candidate regions) in operation S930. Here, the neural network model is trained to acquire a score indicating whether the entire face of a person has been captured, and it may be trained by the method as illustrated in FIG. 4. Also, the electronic device 100 may acquire information on key points (e.g., the eyes, the nose, the mouth, etc.) included in the candidate regions together, along with the scores for the plurality of candidate regions (e.g., a set of scores for the plurality of candidate regions) through the neural network model.

The electronic device 100 may identify at least one person region including the person's face among the plurality of candidate regions based on the acquired scores in operation S940. Specifically, the electronic device 100 may identify a candidate region having a score exceeding a threshold value among the plurality of candidate regions as a person region including a person's face.

The electronic device 100 may acquire information for changing a capturing composition based on location information of the identified person region and a score of the identified person region in operation S950. Specifically, the electronic device 100 may acquire at least one information among a changing direction and a changing distance of the capturing composition based on the location information of the identified person region and the score of the identified person region.

The electronic device 100 may provide guide information based on the information for changing the capturing composition in operation S960. Specifically, the electronic device 100 may provide guide information as illustrated in FIG. 6A to FIG. 6C based on the information for changing the capturing composition (e.g., the information about the changing direction, the information about the changing distance, the information about movement of the person, etc.).

Figure 10:
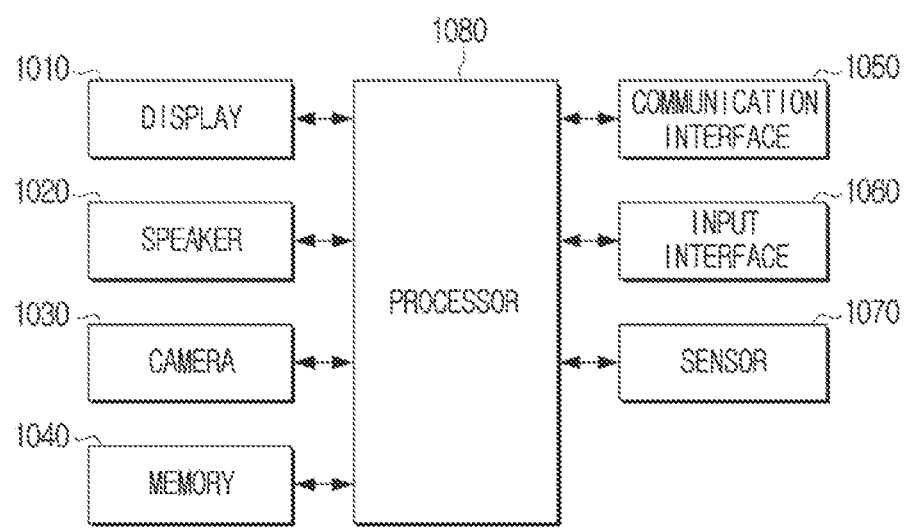
FIG. 10 is a block diagram illustrating a hardware configuration of an electronic device according to an embodiment of the disclosure.

FIG. 10 is a block diagram illustrating a hardware configuration of an electronic device according to an embodiment of the disclosure in more detail. As illustrated in FIG. 10, the electronic device 100 according to the disclosure may include a display 1010, a speaker 1020, a camera 1030, a memory 1040, a communication interface 1050, an input interface 1060, a sensor 1070, and a processor 1080. However, such components are merely exemplary ones, and it is obvious that in carrying out the disclosure, new components can be added in addition to these components, or some components can be omitted. As the display 1010, the camera 1030, the memory 1040, and the processor 1080 are the same components as the display 130, the camera 120, the memory 110, and the processor 140 illustrated in FIG. 1, overlapping explanation will be omitted.

The speaker 1020 may output a voice message. In particular, the speaker 1020 may provide a guide message including information for changing a capturing composition in a form of a voice message. Here, the speaker 1020 may be included inside the electronic device 100, but this is merely an example, and the speaker 1020 may be electronically connected with the electronic device 100, and located outside.

The communication interface 1050 includes a circuit, and may perform communication with an external device. Specifically, the processor 1080 may receive various types of data or information through an external device connected through the communication interface 1050, and may also transmit various types of data or information to an external device.

The communication interface 1050 may include at least one of a WiFi module, a Bluetooth module, a wireless communication module, or an NFC module. Specifically, each of a WiFi module and a Bluetooth module may perform communication by a WiFi method and a Bluetooth method. In the case of using a WiFi module or a Bluetooth module, various types of connection information such as an SSID is transmitted and received first, and connection of communication is performed by using the information, and various types of information can be transmitted and received thereafter.

Also, a wireless communication module may perform communication according to various communication standards such as IEEE, Zigbee, 3rd Generation (3G), 3rd Generation Partnership Project (3GPP), Long Term Evolution (LTE), 5th Generation (5G), etc. Further, an NFC module may perform communication by a near field communication (NFC) method using a 13.56 MHz band among various RF-ID frequency bands such as 135 kHz, 13.56 MHz, 433 MHz, 860-960 MHz, 2.45 GHz, etc.

In particular, in the one or more embodiments according to the disclosure, the communication interface 1050 may receive various types of information such as data related to the neural network model 144, etc. from an external device.

The input interface 1060 includes a circuit, and the processor 1080 may receive a user instruction for controlling the operation of the electronic device 100 through the input interface 1060. Specifically, the input interface 1060 may be implemented in a form that is included in the display 1010 as a touch screen, but this is merely an example, and it may consist of components such as a button, a microphone, and a remote control signal receiver, etc.

In particular, in the one or more embodiments according to the disclosure, the input interface 1060 may receive various user instructions such as a user instruction for executing a camera application, a user instruction for capturing an image, a user instruction for setting a capturing environment through a UI, etc.

The sensor 1070 may acquire various types of information related to the electronic device 100. In particular, the sensor 1070 may include a GPS that can acquire location information of the electronic device 100, and may include various sensors such as a bio sensor (e.g., a heart rate sensor, a PPG sensor, etc.) for acquiring bio information of a user using the electronic device 100, a movement sensor for detecting the movement of the electronic device 100, etc.

According to an embodiment of the disclosure, in the case of performing selfie capturing by using the rear surface camera, the electronic device 100 may provide guide information through at least one of the speaker 1020, the actuator, or the LED. For example, in case the person's face is cropped while performing selfie capturing by using the rear surface camera, the electronic device 100 may acquire information for changing the capturing composition based on a score acquired through the neural network model 144, and provide guide information through at least one of the speaker 1020, the actuator, or the LED based on the acquired information. For example, the electronic device 100 may provide a voice message which is "Turn the electronic device to the left side" through the speaker 1020 based on the information for changing the capturing composition. Alternatively, in case the person's face is cropped, the electronic device 100 may provide vibration through the actuator, and provide a guide message by flicking the LED.

The functions related to the neural network model as described above may be performed through the memory and the processor. The processor may include one or a plurality of processors. Here, the one or plurality of processors may be generic-purpose processors like CPUs, APs, etc., graphic-dedicated processors like GPUs, VPUs, etc., or artificial intelligence-dedicated processors like NPUs. The one or plurality of processors perform control such that input data is processed according to predefined operation rules or an artificial intelligence model stored in the non-volatile memory and the volatile memory. The predefined operation rules or the artificial intelligence model are characterized in that they are made through learning.

Here, being made through learning means that predefined operations rules or an artificial intelligence model having desired characteristics are made by applying a learning algorithm to a plurality of learning data. Such learning may be performed in a device itself wherein artificial intelligence is performed according to the disclosure, or through a separate server/system.

An artificial intelligence model may consist of a plurality of neural network layers. Each layer has a plurality of weight values, and performs an operation of the layer through the operation result of the previous layer and an operation of the plurality of weight values. As examples of a neural network, there are a convolutional neural network (CNN), a deep neural network (DNN), a recurrent neural network (RNN), a restricted Boltzmann machine (RBM), a deep belief network (DBN), a bidirectional recurrent deep neural network (BRDNN), generative adversarial networks (GANs), and deep Q-networks, but the neural network in the disclosure is not limited to the aforementioned examples excluding specified cases.

A learning algorithm is a method for training a specific subject device (e.g., a robot) by using a plurality of learning data and thereby making the specific subject device make a decision or make prediction by itself. As examples of learning algorithms, there are supervised learning, unsupervised learning, semi-supervised learning, or reinforcement learning, but learning algorithms in the disclosure are not limited to the aforementioned examples excluding specified cases.

A storage medium that is readable by machines may be provided in the form of a non-transitory storage medium. Here, the term 'a non-transitory storage medium' only means that the storage medium is a tangible device, and does not include signals (e.g., electromagnetic waves), and the term does not distinguish a case wherein data is stored in the storage medium semi-permanently and a case wherein data is stored in the storage medium temporarily. For example, 'a non-transitory storage medium' may include a buffer wherein data is temporarily stored.

According to an embodiment, methods according to the one or more embodiments disclosed herein may be provided while being included in a computer program product. A computer program product refers to a product, and it can be traded between a seller and a buyer. A computer program product can be distributed in the form of a storage medium that is readable by machines (e.g., a compact disc read only memory (CD-ROM)), or distributed directly on-line (e.g., download or upload) through an application store (e.g., Play Store™), or between two user devices (e.g., smartphones). In the case of on-line distribution, at least a portion of a computer program product (e.g., a downloadable app) may be stored in a storage medium readable by machines such as the server of the manufacturer, the server of the application store, and the memory of the relay server at least temporarily, or may be generated temporarily.

Each of the components (e.g., a module or a program) according to the one or more embodiments of the disclosure as described above may be comprised of a single entity or a plurality of entities, and some sub-components among the aforementioned sub-components may be omitted, or different sub-components may be further included in the one or more embodiments. Alternatively or additionally, some components (e.g., modules or programs) may be integrated into one entity to perform the same or similar functions performed by each component prior to integration.

Operations performed by a module, a program, or another component, in accordance with the one or more embodiments, may be performed sequentially, in parallel, repetitively, or in a heuristic manner, or at least some operations may be performed in a different order, omitted, or a different operation may be added.

The term "a part" or "a module" used in the disclosure may include a unit consisting of hardware, software, or firmware, and may be interchangeably used with, for example, terms such as a logic, a logical block, a component, or a circuit. In addition, "a part" or "a module" may be a component constituted as an integrated body or a minimum unit or a part of the component performing one or more functions. For example, a module may consist of an application-specific integrated circuit (ASIC).

The one or more embodiments of the disclosure may be implemented as software including instructions stored in machine-readable storage media, which can be read by machines (e.g., computers). The machines refer to devices that call instructions stored in a storage medium, and can operate according to the called instructions, and the devices may include an electronic device according to the aforementioned embodiments (e.g., the electronic device 100).

In case an instruction is executed by a processor, the processor may perform a function corresponding to the instruction by itself, or by using other components under its control. An instruction may include a code that is generated or executed by a compiler or an interpreter.

While embodiments of the disclosure have been shown and described, the disclosure is not limited to the aforementioned specific embodiments, and it is apparent that various modifications may be made by those having ordinary skill in the technical field to which the disclosure belongs, without departing from the gist of the disclosure as claimed by the appended claims. Further, it is intended that such modifications are not to be interpreted independently from the technical idea or prospect of the disclosure.

What is claimed is:

1. A method for performed by an electronic device, the method comprising:
   acquiring an image by using a first lens;
   inputting information about a plurality of candidate regions of the image into a neural network model that is trained to acquire a score indicating whether an entire face of a person is captured in a candidate region, and acquiring scores for the plurality of candidate regions;
   identifying a person region including at least part of a person's face among the plurality of candidate regions based on the acquired scores; and
   providing guide information for changing a capturing composition based on information about a location of the identified person region and a score of the identified person region.

2. The method of claim 1, further comprising dividing an edge portion of the image into the plurality of candidate regions, and acquiring location information of the plurality of candidate regions,
   wherein the acquiring the scores comprises:
      inputting information about the plurality of candidate regions of the image into the neural network model, and
      acquiring information on key points in the plurality of candidate regions together with the scores for the plurality of candidate regions.

3. The method of claim 2, further comprising acquiring information about a changing direction of the capturing composition based on information about the location of the identified person region, information on key points in the identified person region, and the score of the identified person region.

4. The method of claim 3, wherein the providing the guide information comprises providing the guide information comprising a message guiding a moving direction of the person in the person region for changing the capturing composition based on the acquired information about the changing direction of the capturing composition.

5. The method of claim 4, wherein the providing the guide information further comprises providing the guide information in a visual form through a display or providing in an auditory form through a speaker.

6. The method of claim 3, further comprising providing a first user interface (UI) element indicating a center of the image while acquiring the image,
   wherein the providing the guide information comprises providing the guide information comprising a second UI element for guiding movement of the first UI element to a location identified based on the acquired information about the changing direction of the capturing composition.

7. The method of claim 1, further comprising displaying a user interface (UI) for setting a change of the first lens for changing a capturing composition.

8. The method of claim 7, further comprising, based on determining that the acquired score is within a threshold range while the setting of the change of the first lens is turned on for changing the capturing composition through the UI, capturing an image by using a second lens different from the first lens based on the information about the location of the identified person region and the score of the identified person region.

9. The method of claim 8, wherein the second lens is configured to acquire the image of a wider field of view than the first lens.

10. The method of claim 1, further comprising:
    acquiring a reference score acquired by multiplying a number of pixels in face parts of a training image comprising the entire face by weights according to an importance of the face parts;
    acquiring a crop score acquired by multiplying a number of pixels in face parts in a crop image which randomly cropped the training image by weights according to the importance of the face parts;
    identifying a ratio of the reference score and the crop score as a face score corresponding to the crop image; and
    training the neural network model based on the crop image and the face score corresponding to the crop image.

11. An electronic device comprising:
    a camera including a first lens;
    a display;
    a memory; and
    a processor configured to:
       acquire an image by using the first lens,
       input information about a plurality of candidate regions of the image into a neural network model that is trained to acquire a score indicating whether an entire face of a person is captured in a candidate region, and acquire scores for the plurality of candidate regions,
       identify a person region including at least part of a person's face among the plurality of candidate regions based on the acquired scores, and
       control the display to provide guide information for changing a capturing composition based on information about a location of the identified person region and a score of the identified person region.

12. The electronic device of claim 11, wherein the processor is further configured to:
    divide an edge portion of the image into the plurality of candidate regions,
    acquire location information of the plurality of candidate regions,
    input information about the plurality of candidate regions of the image into the neural network model, and acquire information on key points in the plurality of candidate regions with scores for the plurality of candidate regions.

13. The electronic device of claim 12, wherein the processor is further configured to acquire information about a changing direction of the capturing composition based on information about the location of the identified person region, information on key points in the identified person region, and the score of the identified person region.

14. The electronic device of claim 13, wherein the processor is further configured to control the display to provide the guide information comprising a message guiding a moving direction of the person in the person region for changing the capturing composition, based on the acquired information about the changing direction of the capturing composition.

15. The electronic device of claim 14, further comprising a speaker,
   wherein the processor is further configured to provide the guide information in an auditory form through the speaker.

* * * * *